(12) United States Patent
Yang et al.

(10) Patent No.: US 7,580,309 B2
(45) Date of Patent: Aug. 25, 2009

(54) MEMORY REFRESH METHOD AND SYSTEM

(75) Inventors: Fan Yang, Taipei (TW); Ching-Hsiang Lin, Taipei (TW); Jie Ding, Taipei (TW)

(73) Assignee: Via Technologies, Inc., Taipei (TW)

( * ) Notice: Subject to any disclaimer, the term of this patent is extended or adjusted under 35 U.S.C. 154(b) by 199 days.

(21) Appl. No.: 11/859,881

(22) Filed: Sep. 24, 2007

(65) Prior Publication Data
US 2008/0170456 A1 Jul. 17, 2008

(30) Foreign Application Priority Data
Jan. 12, 2007 (TW) .............................. 96101236 A

(51) Int. Cl.
*G11C 7/00* (2006.01)
(52) U.S. Cl. .................. 365/222; 365/189.05
(58) Field of Classification Search .................. 365/222, 365/189.05
See application file for complete search history.

(56) References Cited

U.S. PATENT DOCUMENTS 6,226,709 B1  5/2001  Goodwin et al.
6,741,515 B2 *  5/2004  Lazar et al. .................. 365/222
6,795,362 B2 *  9/2004  Nakai et al. .................. 365/222
2005/0235100 A1 * 10/2005  Sakurai ....................... 711/106

FOREIGN PATENT DOCUMENTS

JP  2002230970  8/2002

OTHER PUBLICATIONS

CN Office Action mailed Nov. 21, 2008.
English Translation of JP2002230970.

* cited by examiner

*Primary Examiner*—Son Dinh
(74) *Attorney, Agent, or Firm*—Thomas, Kayden, Horstemeyer & Risley

(57) ABSTRACT

A memory refresh method applicable in a system memory is disclosed. The memory system comprises a plurality of memory ranks. It is to determine whether an access request corresponds to the memory rank, and an idle auto-refresh number of the memory rank is calculated if there is no access request corresponds to the memory rank. The memory rank is switched from an auto-refresh mode to a self-refresh mode when the idle auto-refresh number of the memory rank reaches a predetermined value.

17 Claims, 3 Drawing Sheets

MEMORY REFRESH METHOD AND SYSTEM

BACKGROUND OF THE INVENTION

1. Field of the Invention

The invention relates to memory refresh methods and devices, and in particular to the methods and devices to switch each memory rank of a memory to a self-refresh mode respectively.

2. Description of the Related Art

A system memory stores data from a central processing unit (CPU) and various peripheral components. Usually, as capacity of a system memory increases, power consumption increases accordingly. One commonly used system memory is a dynamic random access memory (DRAM), embodies as a single in-line memory module (SIMM) or dual in-line memory module, (DIMM), with channels referred to as memory ranks. Memory usually comprises a plurality of memory banks, each comprising multiple memory cells arranged in arrays.

BRIEF SUMMARY OF INVENTION

Disclosed is a memory refresh method applied in a system memory. The system memory comprises a plurality of memory ranks. It is to determine whether an access request corresponds to the memory rank, and an idle auto-refresh number of the memory rank is calculated when there is no access request corresponds to the memory rank. The memory rank is switched from an auto-refresh mode to a self-refresh mode when the idle auto-refresh number of the memory rank reaches a predetermined value.

A memory refresh method applicable in a system memory is disclosed. The memory system comprises a plurality of memory ranks. An idle time of an idle memory rank is calculated. The idle memory rank is switched to a self-refresh mode when the idle time of the idle memory rank reaches a predetermined value.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

To maintain data in a system memory, the system memory must refresh periodically, either by self-refresh or auto-refresh mode, either of which refreshes all memory ranks simultaneously.

Based on the definition of JEDEC, the system memory in the auto-refresh mode performs the auto-refresh every steady refresh period $T_{REF}$. A timer is usually configured in a memory system for setting the refresh period $T_{REF}$, such as 7.8 microseconds.

Additionally, based on the definition of JEDEC, system memory performs self-refresh when the computer system is in a power down state or a sleep state. That is, self-refresh is performed only if all the memory ranks are at an idle state. When the system memory is in the self-refresh mode, a clock enable (CKE) signal is pulled to a low level, and other external signals are ineffective. Before a memory accessing signal from an external is triggered, the CKE signal must be stabilized at a high level for a certain time, and then the system memory returns to a working state and is switched to the auto-refresh mode from the self-refresh mode.

Compared to the auto-refresh mode, power is conserved in the self-refresh mode. However, the system memory is switched to the self-refresh mode only if all the memory ranks of the system memory are in an idle state. Thus, even if only one of the memory ranks is in the working state, the system memory cannot enter self-refresh mode. Accordingly, current memory refresh management cannot conserve power effectively.

Furthermore, if there is a request to system memory when the system memory is in an idle state, the system memory cannot return to the working state until the CKE signal is high for a certain time. In this situation, the system will wait for a long time for some instant access requests, such as the access request from a CPU or a graphic chip.

The present invention provides memory refresh methods for individually switching memory ranks between the self-refresh mode and the auto-refresh mode.

Figure 1:
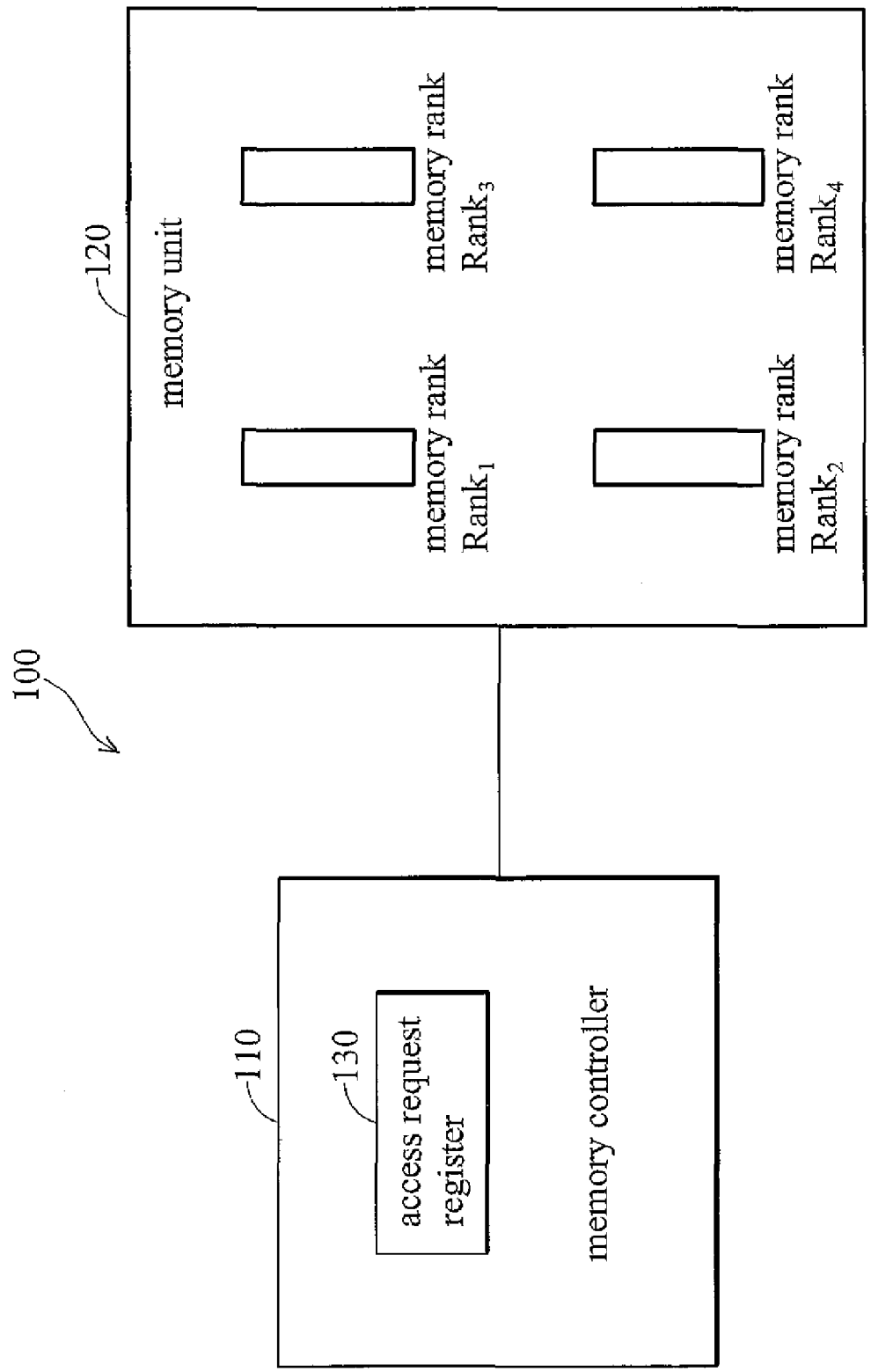
FIG. 1 is a diagram illustrating a memory access system according to embodiments of the invention.

FIG. 1 is a diagram illustrating memory access system 100 of embodiments of the invention. Memory access system 100 comprises a memory controller 110 and a memory unit 120. The memory unit 120 comprises multiple memory ranks coupled to the memory controller 110 respectively, shown here as $Rank_1 \sim Rank_4$. The memory controller 110 comprises an access request register 130 configured to store access requests of the memory unit 120. The memory controller 110 may send a corresponding control signal to the memory unit 120 if there is an access request in the access request register 130. In embodiments of the invention, each memory rank corresponds to a first counter (not shown) and a second counter (not shown).

In the following, it is assumed that the memory unit 120 is in auto-refresh mode in a working state. Take the memory rank $Rank_1$ for example, it is firstly determined whether an access request corresponding to the memory rank $Rank_1$ is in memory register 130. If there is no access request corresponding to the memory rank $Rank_1$ in access request register 130, that is, the memory rank $Rank_1$ is an idle memory rank in a working state, the first counter corresponding to the memory rank $Rank_1$ calculates the number of idle auto-refresh. The idle auto-refresh means that between two auto-refresh operations, no access request corresponding to the memory rank $Rank_1$ is sent. If the number of idle auto-refresh exceeds a predetermined value VAL, which indicating memory rank $Rank_1$ is in an idle state, the memory controller 110 sends a refresh command REF to the memory rank $Rank_1$ to switch the memory rank $Rank_1$ to the self-refresh mode when the next refresh command coming. The refresh command REF may be an auto-refresh command to the memory rank to auto-refresh every refresh period $T_{REF}$ or a self-refresh command to the memory rank to self-refresh. If an access request is sent to the memory rank $Rank_1$ during calculation of the predetermined value VAL, the first counter corresponding to the memory rank Rank$_1$ will be reset, and memory controller 110 will send a control command to access the memory rank Rank$_1$.

As described, it is assumed that only memory rank Rank$_1$ is idle, i.e. no access request corresponding to the memory rank Rank$_1$ is in the access request register 130 and the access requests corresponding to the memory rank Rank$_2$~Rank$_4$ are in the access request register 130. The memory rank Rank$_1$ is switched to self-refresh mode in an idle state when the number of idle auto-refresh exceeds the predetermined value VAL. At the same time, other non-idle memory ranks Rank$_2$~Rank$_4$ will continue in auto-refresh mode according to the definition of JEDEC.

Accordingly, each memory rank may be individually switched to the self-refresh mode or to the auto-refresh mode according to its respective state, the idle state or the working state. Compared to conventional methods, the memory refresh methods in the embodiments of the invention save more power.

Further, when the memory rank Rank$_1$ is in self-refresh mode, and an access request corresponding to the memory rank Rank$_1$ is asserted, the CKE signal of Rank$_1$ will be asserted and the second counter corresponding to the memory rank Rank$_1$ is enabled and begins calculation of a predetermined time period $T_{out}$ (ex. 200T, T is a period of clock). The memory rank Rank$_1$ returns to the working state and accept access request after calculation is finished.

Figure 2:
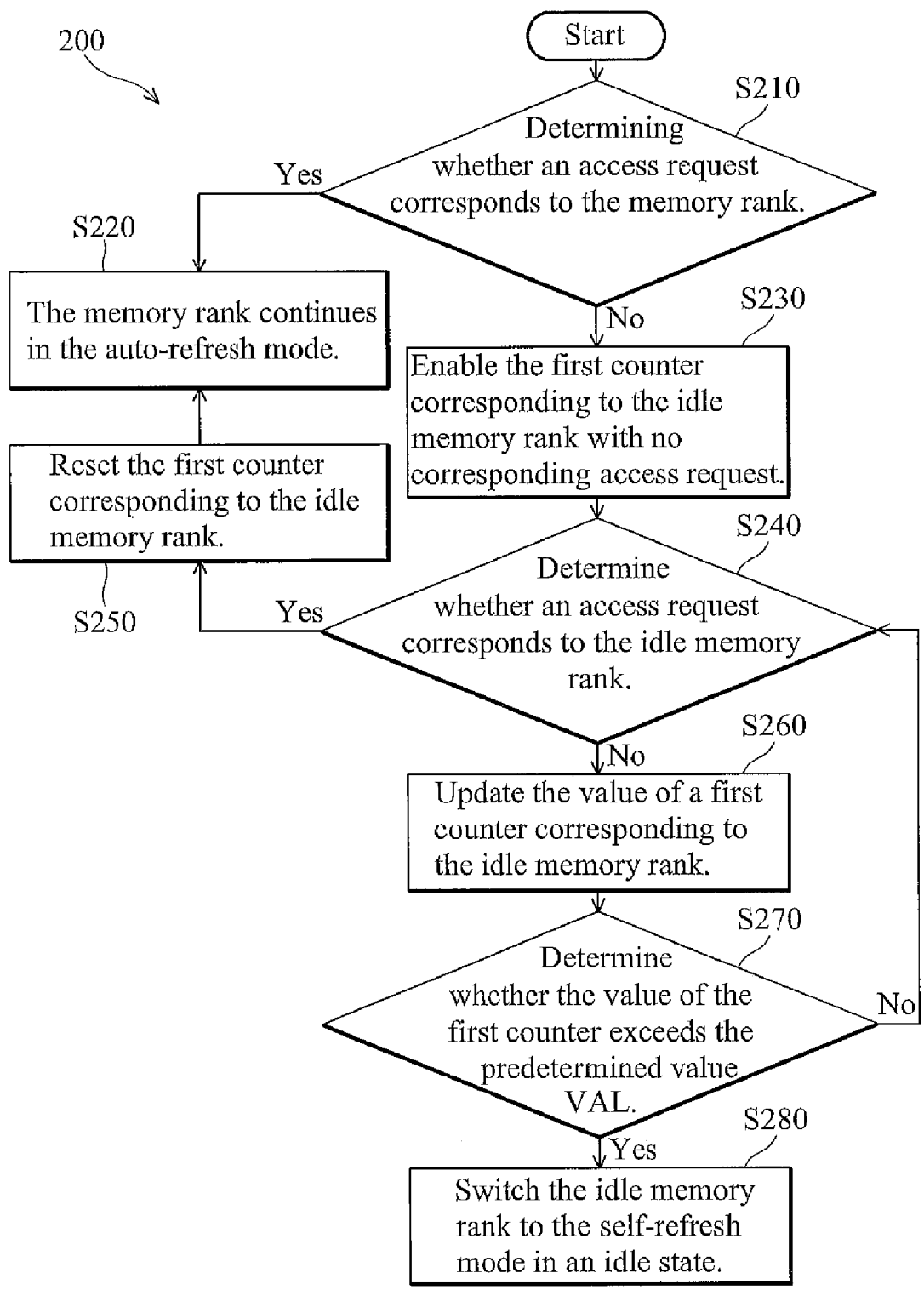
FIG. 2 is a flowchart of a memory refresh method according to embodiments of the invention.

FIG. 2 is a flowchart of a memory refresh method according to embodiments of the invention. Memory unit 120 is assumed to be in the auto-refresh mode in the beginning, and the memory ranks Rank$_1$~Rank$_4$ auto-refresh once every single fresh period $T_{REF}$. Take the memory rank Rank$_1$ for an example, it is firstly determined whether there is an access request corresponding to the memory rank Rank$_1$ (S210). If so, the memory rank Rank$_1$ will continue in the auto-refresh mode in a working state and await to be accessed (S220). If no access request corresponding to the memory rank Rank$_1$, that is, the memory rank Rank$_1$ is in the idle state, thus the first counter corresponding to the idle memory rank (i.e. the memory rank Rank$_1$) is enabled (S230). After that, determining whether an access request corresponds to the idle memory rank is present in access request register 130 (S240). If so, the first counter corresponding to the idle memory rank will be reset (S250) and the idle memory rank remains in the auto-refresh mode in a working state for being accessed (S220). If there is no access request corresponds to the idle memory rank in access request register 130, the value of a first counter corresponding to the idle memory rank is updated (S260). It is then determined whether the value of the first counter exceeds the predetermined value VAL (S270). If not, it is then returned to step S240, determining whether an access request corresponding to the idle memory rank in access request register 130. If the value of the first counter exceeds or equal to the predetermined value VAL, which indicating memory rank Rank$_1$ has been in the idle state for a predetermined time, so the idle memory rank will be switched to the self-refresh mode for power saving (S280).

Figure 3:
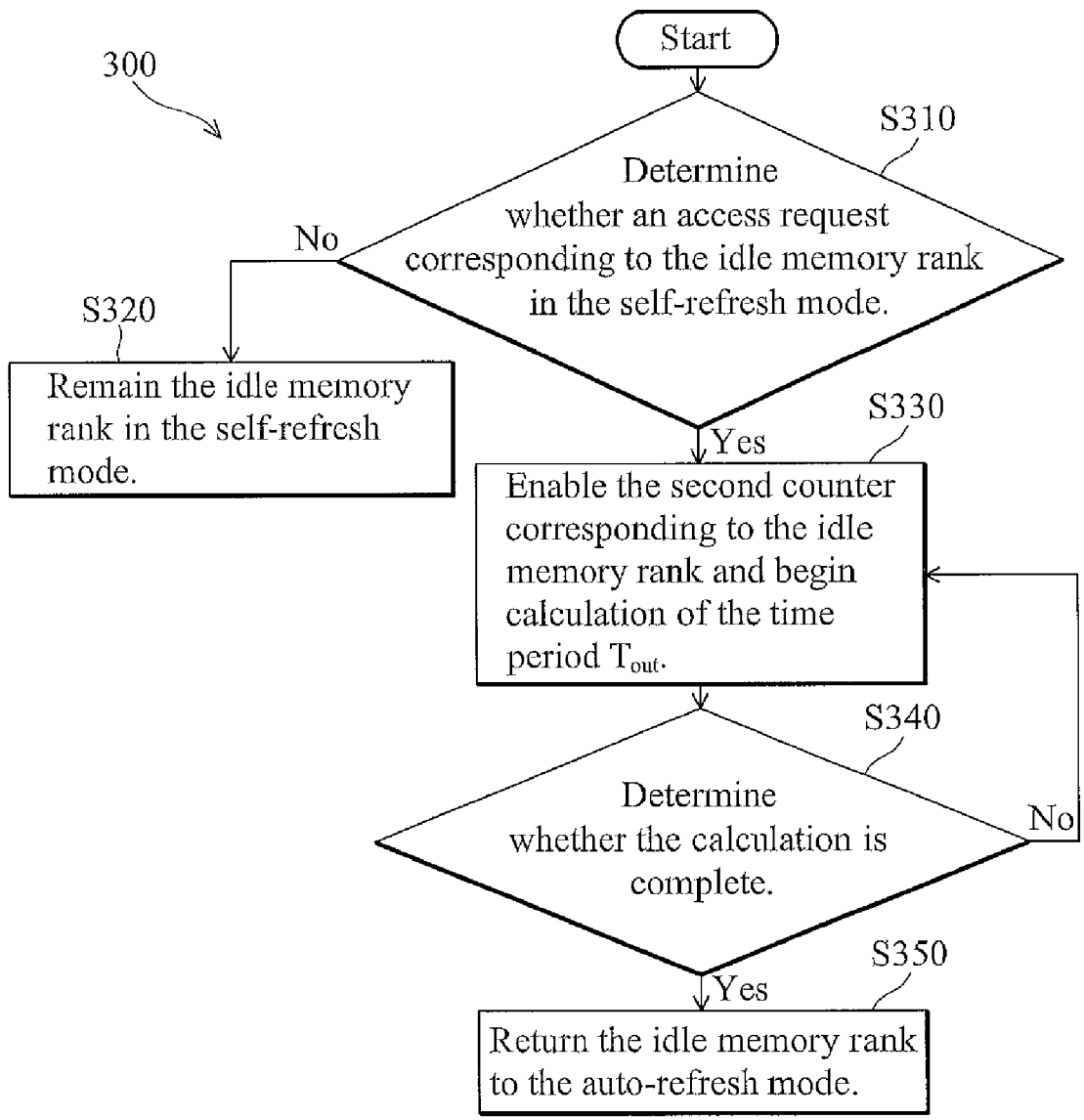
FIG. 3 is a flowchart of a method to switch a memory rank in self-refresh mode to auto-refresh mode according to embodiments of the invention.

FIG. 3 is a flowchart of method 300 of switching the memory rank in the self-refresh mode to the auto-refresh mode according to embodiments of the invention. First, it is determined whether there is an access request corresponding to the idle memory rank in the self-refresh mode in memory controller (S310). If not, the idle memory rank remains in self-refresh mode (S320). If so, the memory controller should assert the CKE signal of this idle memory rank, and the second counter corresponding to the idle memory rank is enabled and begins calculation of the time period $T_{out}$ (S330).

The idle memory rank returns to the working state and switches to the auto-refresh mode when the time period $T_{out}$ is expired (S340 and S350).

The memory refresh methods according to the embodiments of the invention improve on conventional methods in that the memory ranks can individually choose to auto-refresh or self-refresh according to the respective access request. In the embodiments of the invention, because each memory rank corresponds to the first counter respectively, the memory ranks in an idle state are switched to the self-refresh mode and the memory ranks not in an idle state are kept in the auto-refresh mode, reduction of power consumption is thus achieved.

In the embodiments of the invention, the idle time of the memory ranks is determined by the first counter with the number of idle auto-refreshes. The idle time further determines whether or not to switch the memory rank to the self-refresh mode. However, it should be understood that, based on the specification of JEDEC, the auto-refresh is performed once every single refresh period $T_{REF}$, and the refresh period $T_{REF}$ is about 7.8 microseconds. Thus, an alternative to using a timer to calculate the idle time of the memory ranks to determine whether the memory ranks are switched to the self-refresh mode is considerable.

In the embodiments of the invention, if an access request corresponding to the idle memory rank in the auto-refresh mode is sent, the first counter corresponding to the idle memory rank will be reset, thus the idle memory rank remains in a working state and is accessible. Otherwise, if there is an access request corresponding to the idle memory rank in the self-refresh mode, the second counter corresponding to the idle memory rank begins calculation of the time period $T_{out}$. The idle memory rank returns to the working state to be accessible and is switched to the auto-refresh mode when calculation is finished, and then, this access request can be sent to this memory rank.

The kernel logic chip of computer systems usually detects CPU states by a power management unit (PMU). If CPU will send an access request, the PMU triggers a PMU access request signal. The PMU access request signal generally will be sent earlier than other access requests. When the access request is sent by the CPU or the graphic chip, the second counters corresponding to the memory ranks are enabled earlier than other access requests. Thus, the memory rank returns to the working state and is switched to the auto-refresh mode earlier. Therefore, the instant access requests are answered instantaneously, and the system will not crash from long waiting time.

While the invention has been described by a way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A memory refresh method, applied in a system memory having a plurality of memory ranks, comprising:
    determining whether an access request corresponds to the memory rank;
    calculating an idle auto-refresh number of the memory rank, if no corresponding access request corresponds to the memory rank; and
    switching the memory rank from an auto-refresh mode to a self-refresh mode, if the idle auto-refresh number of the memory rank reaches a predetermined value.

2. The memory refresh method as claimed in claim 1, wherein the memory initially is in auto-refresh mode, and performs auto-refresh every single refresh period.

3. The memory refresh method as claimed in claim 1, further comprising: issuing a refresh command for switching the memory rank to the self-refresh mode, if the idle auto-refresh number of the idle memory reaches the predetermined value.

4. The memory refresh method as claimed in claim 3, wherein the refresh command is an auto-refresh command or a self-refresh command.

5. The memory refresh method as claimed in claim 1, further comprising: maintaining the memory rank with corresponding access request in the auto-refresh mode.

6. The memory refresh method as claimed in claim 1, wherein calculation of the idle auto-refresh number comprises:
   determining whether an access request is sent to the memory rank having no corresponding access request; and
   updating the idle auto-refresh number of the memory rank during the auto-refresh mode, if no access request is sent to the memory rank.

7. The memory refresh method as claimed in claim 6, further comprising: resetting the idle auto-refresh number of the memory rank, if an access request is sent to the memory rank during calculation of the predetermined value.

8. The memory refresh method as claimed in claim 1, further comprising: detecting whether an access request is sent out for the memory rank in the self-refresh mode.

9. The memory refresh method as claimed in claim 1, further comprising: switching the memory rank from the self-refresh mode to the auto-refresh mode after a predetermined time, if an access request is sent to the memory rank in the self-refresh mode.

10. The memory refresh method as claimed in claim 1, further comprising: keeping the memory rank in the self-refresh mode, if no access request corresponds to the memory rank.

11. A memory refresh method, applied in a system memory having a plurality of memory ranks, comprising:
   calculating an idle time of an idle memory rank; and
   switching the idle memory rank to a self-refresh mode, if the idle time of the idle memory rank reaches a predetermined value.

12. The memory refresh method as claimed in claim 11, wherein the idle memory rank is the memory rank having no corresponding access request.

13. The memory refresh method as claimed in claim 11, wherein the idle time is calculated based on auto-refresh times of the idle memory rank.

14. The memory refresh method as claimed in claim 13, further comprising: recalculating the idle time of the idle memory rank if an access request is sent to the memory rank during calculation of the idle time.

15. The memory refresh method as claimed in claim 11, further comprising: detecting whether an access request is sent out for the memory rank in the self-refresh mode.

16. The memory refresh method as claimed in claim 11, further comprising: switching the memory rank from the self-refresh mode to the auto-refresh mode after a predetermined time, if an access request is sent to the memory rank in the self-refresh mode.

17. The memory refresh method as claimed in claim 11, further comprising: keeping the memory rank in the self-refresh mode if no access request corresponds to the memory rank.

* * * * *